Figure 1:
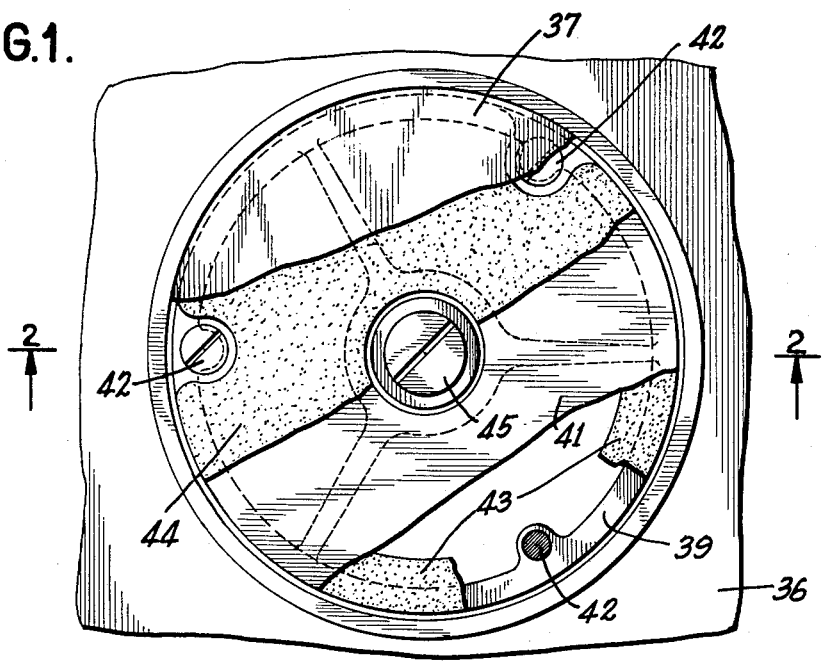

Aug. 8, 1933.  L. A. SHARP  1,921,170

MARBLE RING HOLDER FOR OUTLET BOXES

Original Filed July 5, 1929

L. Alan Sharp
INVENTOR

BY ATTORNEYS

Cooper, Kerr & Dunham

Patented Aug. 8, 1933

1,921,170

UNITED STATES PATENT OFFICE 1,921,170

MARBLE RING HOLDER FOR OUTLET BOXES

L Alan Sharp, Avalon, Pa., assignor to National Electric Products Corporation, New York, N. Y., a Corporation of Delaware Original application July 5, 1929, Serial No. 376,240. Divided and this application July 24, 1930. Serial No. 470,411

5 Claims. (Cl. 247—19)

This invention relates to improvements of junction boxes of the floor type which are used in connection with conduit systems for the distribution of electricity.

In electrical conduit systems it is the present practice to place junction boxes in floors and to provide a removable covering plate to cover the top of the junction box, which cover plate when removed, affords access to the interior of the box. The lower parts of the junction box are connected to conduits and frequently concrete is embedded around the junction box. Various kinds of finished floor or floor coverings are used.

In practice the thickness of the concrete may vary. The thickness of the finished floor or floor covering may vary and accordingly, to minimize expense and to facilitate installation, provision should be made whereby the overall height of the junction box can be varied to suit the particular installation conditions so that when the installation is complete the top of the top cover plate will be flush with the finished floor surface.

The present invention relates to a junction box of the type above specified and is more particularly directed to the provision of an improved construction for holding marble in position and permitting its removal when access to the interior of the junction box is desired.

A further object of the present invention resides in the provision of an improved junction box construction including a marble holding ring with improved means for sealing the completed box assembly against the entrance of moisture.

Other objects and advantages of the present invention will be hereinafter set forth in the accompanying specification and claims and shown in the drawing which by way of illustration shows a preferred embodiment of the invention.

Figure 2:
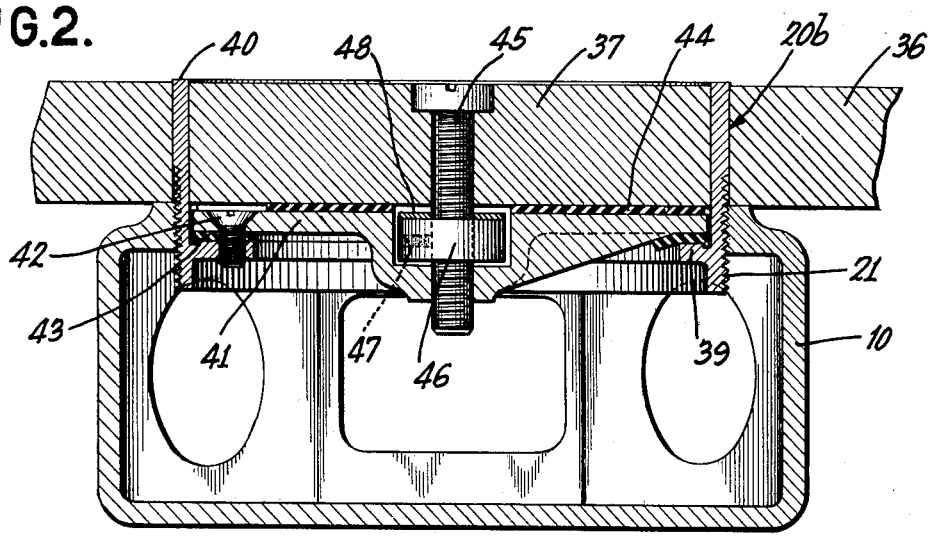

In the drawing:

Figure 1 is a top plan view of the junction box with the improved holder for a marble disc in which box and holder are adapted to be used when the junction box is placed in marble flooring; and Fig. 2 is a detail sectional view of a marble disc holder and associated parts shown in Fig. 1, the section being taken substantially on lines 2—2 of Fig. 1.

In more detail in the drawing the junction box proper comprises a casting or main body portion 10 provided with a number of couplings to receive conduits extending therein.

In the installation of junction boxes of this general character, such junction boxes are installed prior to the laying of the marble of the floor and frequently are placed in position before embedding concrete material is placed therearound.

With such constructions, it is desirable to provide means whereby the junction box proper can be placed in a desirable position and then to provide means so that the top of the junction box or more particularly the marble ring holder will exactly line up with the finished floor surface. Accordingly, each junction box is provided with a ring element generally designated 20b. This ring element 20b is exteriorly threaded as shown at 21, and these threads engage internal threads in an opening in the top of the main body portion 10 of the junction box. Accordingly, the ring 20b may be advanced in or out to a desired extent and in this way the top of the junction assembly can be established at a desired point or elevation according to thickness of the marble which is to overlie the junction box.

With marble floor constructions it is the general practice to provide an inserted disc of marble which is removable to afford access to the interior of the junction box. In the drawing such marble floor construction is illustrated. The character 36 is used to designate the marble floor proper. 37 is the inserted marble disc, this disc being disposed within the marble holding ring 20b. Member 20b is provided with a flanged portion 39 and with an upstanding annular portion 40 which closely fits an opening in the main marble floor 36 and which is also adapted to receive the marble ring 37. After member 20b has been adjusted to the proper vertical position, a closure member 41 is placed in position and held in such position by screws 42. A gasket 43 is also provided intermediate 41 and the flanged portion 39 to seal the junction of these parts and to prevent the passage of moisture into the junction box. Overlying part 41 is a cushion pad or rubber packing 44. This pad is suitably apertured to permit access to the screws 42 as shown in Fig. 1. The member 41 is also threaded to receive a cap stud 45 which projects up through an opening in the center of the marble disc 37. By tightening down upon this stud 45 the marble disc 37 can be firmly clamped down upon the pad 44 and if at any time it is desired to remove the marble disc 37 in order to obtain access to the junction box below, it is only necessary to back out upon stud 45 until a member 46 which is secured to the stud by means of a set screw 47, forces upwardly a fiber washer 48 and presses the marble ring out of the annular ring 40. This will elevate the marble ring and free it from the pad 44.

It will be understood that the stud 45 and its related parts provide means for forcing the marble disc out in the event that the pad 44 has frozen to the disc or to the closure member 41. With the marble ring removed, closure 41 is accessible for removal. This is effected by merely removing the screws 42.

In the drawing the marble holding ring is shown projecting slightly above the top surface of the marble 36. It will be understood that after installation, it is the customary practice to grind down the marble and this grinding operation grinds down the top of the marble ring so that it is flush with the finished surface of the marble floor.

The present application constitutes a division of my copending application, Serial No. 376,240, filed July 5, 1929.

I claim:

1. A junction box having a threaded opening therein, a marble holding ring having an upstanding annular boss portion which is exteriorly threaded to engage the threads of said box and having a flange portion forming a gasket seat, a gasket thereon, a closure member supported upon said gasket and secured to said flange, and a marble disc removably secured to said closure member and peripherally abutting the upstanding flange of the holding ring.

2. The invention set forth in claim 1 in which a cushioning pad is provided intermediate the marble disc and the closure member.

3. The invention set forth in claim 1 in which a stud is threaded into the closure, which stud extends through the marble ring for securing the latter in position.

4. A junction box with a threaded aperture, with a marble retaining ring with portions threaded to engage the threads of the aperture and with an inwardly extending flange portion, a closure plate removably secured by screws to the flange portion of the ring, a gasket between said flange and the closure plate, a marble disc fitted within the marble retaining ring over the closure plate, a cushioning pad intermediate the marble disc and the closure plate, a stud having a head portion seating in a recess in the marble disc and having a shank portion threaded into the closure plate, and means fixed upon said stud intermediate the marble ring and the closure plate and adapted to force the marble ring upwardly when the stud is unscrewed from the closure plate.

5. A junction box provided with a removable marble retaining ring, a closure for said ring removably secured thereto and at its outer periphery abutting the interior of said ring, a marble disk fitted within the ring, securing means for removably securing the said marble disk to the aforesaid closure, and means for forcing the removable disk away from the closure when said disk is to be removed.

L ALAN SHARP.